United States Patent
Monette, Jr.

(10) Patent No.: US 9,850,552 B2
(45) Date of Patent: Dec. 26, 2017

(54) METHOD FOR INCREASING BALLISTIC RESISTANT PERFORMANCE OF ULTRA HIGH HARD STEEL ALLOYS

(71) Applicant: Stephen A. Monette, Jr., New Bedford, MA (US)

(72) Inventor: Stephen A. Monette, Jr., New Bedford, MA (US)

(73) Assignee: INCIDENT CONTROL SYSTEMS, New Bedford, MA (US)

( * ) Notice: Subject to any disclaimer, the term of this patent is extended or adjusted under 35 U.S.C. 154(b) by 1061 days.

(21) Appl. No.: 13/664,083

(22) Filed: Oct. 30, 2012

(65) Prior Publication Data

US 2015/0267274 A1  Sep. 24, 2015

Related U.S. Application Data

(63) Continuation-in-part of application No. 13/167,154, filed on Jun. 23, 2011, now abandoned.
(Continued)

(51) Int. Cl.
*C21D 6/04* (2006.01)
*C21D 9/42* (2006.01)
(Continued)

(52) U.S. Cl.
CPC ............... *C21D 6/04* (2013.01); *B32B 5/02* (2013.01); *B32B 5/024* (2013.01); *B32B 5/18* (2013.01); *B32B 5/22* (2013.01); *B32B 5/245* (2013.01); *B32B 5/26* (2013.01); *B32B 7/12* (2013.01); *B32B 15/046* (2013.01); *B32B 15/14* (2013.01); *B32B 15/18* (2013.01); *B32B 37/1018* (2013.01); *C21D 6/004* (2013.01); *C21D 6/005* (2013.01); *C21D 9/42* (2013.01); *C22C 38/04* (2013.01); *C22C 38/44* (2013.01);
(Continued)

(58) Field of Classification Search
CPC ........ C21D 9/42; C21D 11/00; C21D 11/005; C21D 2211/008; C21D 2251/00; C21D 2251/02; C21D 2251/04; C21D 6/004; C21D 6/005; C21D 6/04; C21D 9/48; C21D 2241/00; C22F 1/002
USPC ................................................. 148/517, 577
See application file for complete search history.

(56) References Cited

U.S. PATENT DOCUMENTS 3,335,046 A    8/1967 Current et al.
4,835,033 A *  5/1989 Auyer .................... E05G 1/024
                                              428/131
(Continued)

FOREIGN PATENT DOCUMENTS

WO    WO 2010146535 A2 * 12/2010 ............. C21D 6/005

OTHER PUBLICATIONS

HS-105 (trademark), Alloy Digest, ASM International, Nov. 2006.*
(Continued)

*Primary Examiner* — Scott Kastler
*Assistant Examiner* — Vanessa Luk
(74) *Attorney, Agent, or Firm* — Lambert & Associates; Gary E. Lambert; David J. Connaughton, Jr.

(57) ABSTRACT

A method of processing ultra high hardness steel is provided to increase its usefulness in armor applications. The method involves slowly cooling the ultra high hardness steel to a cryogenic temperature, slowly returning the steel to an ambient temperature, slowly heating the steel, and again slowly returning it to an ambient temperature.

14 Claims, 4 Drawing Sheets

Related U.S. Application Data

(60) Provisional application No. 61/642,190, filed on May 3, 2012.

(51) Int. Cl.
*C21D 6/00* (2006.01)
*C22C 38/44* (2006.01)
*C22C 38/04* (2006.01)
*B32B 5/24* (2006.01)
*B32B 5/26* (2006.01)
*B32B 15/14* (2006.01)
*F41H 5/04* (2006.01)
*B32B 37/10* (2006.01)
*B32B 5/02* (2006.01)
*B32B 5/18* (2006.01)
*B32B 5/22* (2006.01)
*B32B 7/12* (2006.01)
*B32B 15/04* (2006.01)
*B32B 15/18* (2006.01)
*B32B 37/12* (2006.01)
*B32B 38/00* (2006.01)
*B32B 38/08* (2006.01)

(52) U.S. Cl.
CPC ........... *F41H 5/045* (2013.01); *F41H 5/0464* (2013.01); *B32B 37/12* (2013.01); *B32B 38/08* (2013.01); *B32B 2038/0076* (2013.01); *B32B 2260/021* (2013.01); *B32B 2260/023* (2013.01); *B32B 2260/046* (2013.01); *B32B 2262/0253* (2013.01); *B32B 2262/0261* (2013.01); *B32B 2262/0269* (2013.01); *B32B 2262/101* (2013.01); *B32B 2262/105* (2013.01); *B32B 2262/106* (2013.01); *B32B 2266/045* (2013.01); *B32B 2305/076* (2013.01); *B32B 2307/102* (2013.01); *B32B 2307/536* (2013.01); *B32B 2307/558* (2013.01); *B32B 2307/58* (2013.01); *B32B 2307/718* (2013.01); *B32B 2309/105* (2013.01); *B32B 2311/00* (2013.01); *B32B 2571/02* (2013.01); *B32B 2605/00* (2013.01); *B32B 2605/08* (2013.01); *C21D 2211/008* (2013.01); *Y10T 29/49764* (2015.01); *Y10T 29/49826* (2015.01); *Y10T 156/10* (2015.01)

(56) References Cited

U.S. PATENT DOCUMENTS

| | | | |
|---|---|---|---|
| 5,306,557 A | 4/1994 | Madison | |
| 6,056,857 A * | 5/2000 | Hunt | C23C 14/564 148/577 |
| 6,506,270 B2 * | 1/2003 | Takashina | C21D 6/04 148/517 |
| 6,698,331 B1 | 3/2004 | Yu et al. | |
| 6,811,581 B2 * | 11/2004 | Yamada | B23F 21/16 428/216 |
| 7,225,717 B2 | 6/2007 | Williams | |
| 7,608,322 B2 * | 10/2009 | Thurau | F41H 5/04 428/297.1 |
| 7,712,409 B2 | 5/2010 | Cunningham et al. | |
| 2001/0053645 A1 | 12/2001 | Henderson | |
| 2004/0213975 A1 | 10/2004 | Scott et al. | |
| 2004/0216595 A1 | 11/2004 | Dickson | |
| 2009/0087681 A1 * | 4/2009 | Decker | F41H 5/0442 428/649 |
| 2009/0229417 A1 * | 9/2009 | Shepard | B21D 37/01 76/101.1 |
| 2009/0291014 A1 * | 11/2009 | Vartanov | C21D 6/004 420/91 |
| 2010/0212056 A1 | 8/2010 | Sullivan | |

OTHER PUBLICATIONS

W. F. Gale and T. C. Totemeier (editors), "Tempering," Heat treatment of steel, Smithells Metals Reference Book, eighth ed., ASM International, Elsevier, 2004, Ch. 29.2.8, pp. 29-33 to 29-40.*

ATI Defense, ATI 600-MIL Ultra High Hard Specialty Steel Armor, Preliminary Draft Data Sheet, Aug. 10, 2010, p. 1-4, Version 4, ATI Defense, Pittsburgh, PA.

Dwight D. Showalter, William A. Gooch, Matthew S. Burkins, and R. Stockman Koch, Ballistic Testing of SSAB Ultra-High Hardness Steel for Armor Applications, Army Research Laboratory, Oct. 2008, p. 1-52, ARL-TR-4632, Army Research Laboratory, Aberdeen Proving Ground, MD.

* cited by examiner

METHOD FOR INCREASING BALLISTIC RESISTANT PERFORMANCE OF ULTRA HIGH HARD STEEL ALLOYS

CROSS REFERENCE TO RELATED APPLICATIONS

This application is a non-provisional application of, and claims the benefit to, provisional application No. 61/642,190 filed May 3, 2012. Further, this application is a continuation in part application of, and claims the benefit to, non-provisional application Ser. No. 13/167,154 filed on Jun. 23, 2011.

BACKGROUND OF THE INVENTION

Field of the Invention

The present invention relates generally to metal treatment. More particularly the present invention relates to a process of treating ultra high hard steel to have properties better suited for armor applications.

Description of Related Art

One drawback caused by the formulation of ultra high harness (UHH) steel (Steel alloy having a Rockwell Hardness C (HRC) value of >55) is that it is quite brittle. UHH steel is substantially harder than other hardened steels such as "High Hard" steel (Mil-DTL-46100), which exhibits an HRC of approximately 51-53, but the high hard steel is not nearly as brittle.

UHH steel having HRC values of approximately 55-70 has been heretofore dismissed as being useful for armor applications because of its brittleness (See Army Research Laboratory, *Ballistic Testing of SSAB Ultra-High-Hardness Steel for Armor Applications*, Showalter, Dwight D., et al. October 2008, ARL-TR-4632, pages 11-18). UHH steel, despite having a desirable hardness, is considered to be too brittle for armor applications. The brittleness is generally so substantial that a UHH steel plate may work once to defeat a projectile, but will be nearly useless after an initial impact because the plate is so heavily cracked or shattered. As such, the prior art teaches away from the use of UHH steel in armor applications.

Therefore, what is needed is a high hardness steel alloy that is sufficiently ductile to resist cracking or shattering upon ballistic projectile impact.

SUMMARY OF THE INVENTION

The subject matter of this application may involve, in some cases, interrelated products, alternative solutions to a particular problem, and/or a plurality of different uses of a single system or article.

In one aspect a method of processing ultra high hardness steel is provided. The method begins with placing a panel of quenched, un-tempered ultra high hardness (UHH) steel in a vessel. Next, the temperature of the UHH steel is slowly decreased from ambient temperature to a cryogenic temperature of between −30 Fahrenheit (F) and −450 F. In one embodiment, the cryogenic temperature may be between −300 F and −450 F. The UHH steel is then maintained at the cryogenic temperature for a period of less than 48 hours. After this period, the UHH steel is slowly returned to ambient temperature. The UHH steel is retained at ambient temperature for a period of less than 72 hours. After this period, the UHH steel is heated to a temperature of between 200 F and 500 F and held at this temperature for a period of less than 10 hours. Finally, the UHH steel is returned to ambient temperature and removed from the vessel.

In another aspect, a method of processing UHH steel to increase an elongation of the metal without decreasing the hardness is provided. The method begins with slowly decreasing the UHH steel from ambient temperature to a cryogenic temperature of between −30 Fahrenheit (F) and −450 F. The UHH steel is then maintained at the cryogenic temperature for a period of less than 48 hours. After this period, the UHH steel is slowly returned to ambient temperature. The UHH steel is retained at ambient temperature for a period of less than 72 hours. After this period, the UHH steel is heated to a temperature of between 200 F and 500 F and held at this temperature for a period of less than 10 hours.

DETAILED DESCRIPTION

Figure 1:
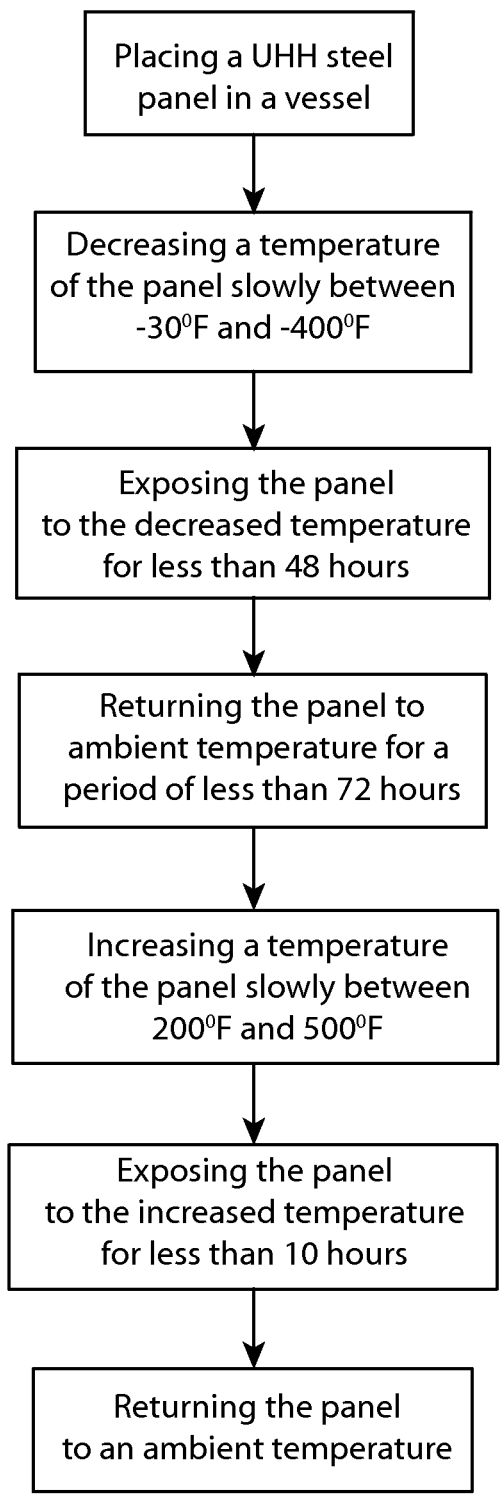
FIG. 1 provides a flow chart of an embodiment of the present invention.

The present invention comprises a metal treatment method that achieves a superior steel alloy for use in armor applications by utilizing the hardness of the ultra-high hard (UHH) steel to shatter and destroy incoming projectiles. At the same time, the present invention overcomes the problem of brittleness and cracking of the steel alloy. The result is a highly effective, low cost armor system that does not add any measurable weight to the steel alloy.

The UHH steel used herein may be of varying size and shape, and is not limited by varied configurations. In one embodiment, the UHH steel layer may be approximately 0.100 inch in thickness. In another embodiment, the UHH steel layer may be approximately 0.500 inch in thickness. In still another embodiment, the UHH steel layer may be approximately 0.250 inch thick. In yet another embodiment, the UHH steel layer may vary between 0.100 inch and 0.500 inch in thickness, depending on the projectiles it is intended to defeat.

The UHH steel contemplated herein may be any steel based alloy having a HRC hardness of greater than 55. In one embodiment, the hardness of the UHH steel may be between approximately 55 and 70. To achieve hardness in this range, the steel may consist of approximately the following elements by weight percentage: 0.43-0.47% carbon, 0.377-1.000% molybdenum, 0.70-1.00% manganese, 0.48-1.5% chromium, and 3% nickel, the balance being iron, and other trace alloying elements which are not critical to the hardness of the UHH steel.

To reduce the brittleness seen in ultra high hard steel armor panels, the UHH steel is subjected to a treatment process that alters the microstructure of the steel armor panel, while increasing the elongation of the steel alloy by nearly 100% with virtually no change in the hardness of the steel.

The treatment process contemplated herein is used to change the microstructure of the ultra high hard steel alloy. In this process, initially a quenched, un-tempered ultra high hard steel panel as noted above is slowly subjected to cryogenic temperatures between −30 degrees Fahrenheit (F) and −450 degrees F. for a period not to exceed 72 hours. In one embodiment, the panel is exposed to cryogenic temperatures for approximately 48 hours. In another embodiment, the panel is exposed to cryogenic temperatures for approximately 36 hours. In still another embodiment, the panel is exposed to cryogenic temperatures for approximately 24 hours.

In one embodiment, the temperature of the panel is brought from an ambient temperature to between −30 F and −450 F at a rate of approximately five to ten degrees F. per minute. In a further embodiment, the temperature decrease rate may be controlled by a computerized controller, the temperature being measured by a thermocouple, thermostat, or similar device.

After the exposure to cryogenic temperatures, the panel is slowly returned back to ambient room temperature over a period not to exceed 72 hours. In one embodiment, the temperature of the panel is brought from the temperature between −30 F and −450 F to ambient temperature at a rate of approximately five to ten degrees F. per minute. In a further embodiment, the temperature increase rate may be controlled by a computerized controller, the temperature being measured by a thermocouple, thermostat, or similar device.

The step of returning the panel to ambient temperatures is followed by a post warming cycle which involves heating the panel to between 200 degrees F. and 500 degrees F., for a time period not to exceed 10 hours. In one embodiment, the panel may be heated to between 200 and 300 F. In some embodiments, the time period of the post tempering cycle may be approximately one hour. In other embodiments, the time period of the post tempering cycle may be approximately 30 minutes.

In one embodiment, the temperature of the panel is brought from an ambient temperature to between 200 F and 500 F at a rate of approximately five to ten degrees F. per minute. In a further embodiment, the temperature increase rate may be controlled by a computerized controller, the temperature being measured by a thermocouple, thermostat, or similar device. In one embodiment, the exposure to Finally, the panel is removed from heat and again brought back to ambient temperature. These steps result in a processed UHH steel panel capable of armor applications.

In one embodiment, the entire process may be carried out with the UHH steel panel contained within a single vessel. In another embodiment, the UHH steel panel may be cooled in one vessel, and heated in another vessel. In still another embodiment, the UHH steel panel may be cooled in one vessel, returned to ambient temperature in another vessel, and heated in yet another vessel.

When the ultra high hard steel armor panel is cycled through the above described process, virtually all cracking and crack growth are eliminated upon ballistic projectile impact, while an increase in V-50 performance is seen versus a non-processed UHH steel panel. Additionally, improvements in microstructure, elongation and ultimate strength of the steel material are seen with no appreciable change in HRC values.

When processed UHH steel armor panel treated with the above process is shot with an NATO M80 Ball projectile at 2750 fps, it has shown little to no visible cracks and exhibits a ductile type of failure. In contrast, an untreated UHH steel alloy panel of the same thickness tested against the same projectile at the same velocity has shown significant cracking and shear plug failure modes. This type of failure negatively impact the steel alloy armor panel's ability to withstand multiple impacts.

To ascertain the ultra high hard steel properties with and without the process described herein, several metallurgical tests and analysis were completed. A single panel measuring 0.1875" was tested for Tensile Strength, Elongation, Hardness (HRC) and Yield strength using ASTM E-18, incorporated herein by reference. The panel subjected to the process described herein showed a hardness value of 57.7 (HRC) while the non-processed UHHS panel showed a hardness value of 57.5 (HRC). The non-processed panel showed an elongation value of approximately 5% while the processed UHH steel panel showed an elongation value of approximately 10%. The processed panel showed a tensile strength of 317,000 psi while the non-processed panel showed a value of 344,000 psi. The apparent reduction in tensile strength is quite normal given the significant increase in elongation. Both the processed and non-processed panels were examined under a microscope to determine any changes in microstructure. The untreated panel showed approximately 2% of retained austenite, a soft component of steel alloys and a leftover byproduct of rapid liquid quenching of steel alloys. The treated panel shows no evidence of retained austenite thereby indicating the cryogenic and tempering process has converted any retained austenite into hard martensite.

To ascertain the process parameters that have the most positive effects, experiments were conducted on the ultra high hard steel alloy with just cryogenic treatment (low temperature phase) and no post warming. Next an experiment was conducted subjecting the panel to just the post warming (high temperature phase) and no cryogenic treatment. The results of both tests show the results to bear little resemblance to panels that were treated with the process described herein utilizing the combination of cryogenic and post warming cycles. In fact, the single phase treated UHH steel panels show negative results such as lower ballistic performance, greater shear plugging and greater cracking at the point of ballistic impact.

This is an unexpected result of the unique UHH Steel alloy. Traditionally, with more conventional metals (such as tool steel), a cryogenic treatment phase alone; or a post warming phase alone would be expected to yield some desirable change to the metal. Unexpectedly however, it has been seen that for the UHH Steel, the separate treatment phases yield negative results, while the combination of the processes yield extremely positive results. As such, it is clear that both cryogenic treatment and heat warming phases are required in combination to achieve the processed UHH steel properties desired for armor applications. This would not be expected based on traditional knowledge of metal properties.

To ascertain the ultra high hard steel ballistic defeating properties with and without processing, several destructive ballistic V-50 tests were completed using MIL-STD-622F, incorporated herein by reference. Both the untreated and processed panels were subjected to V-50 testing using the NATO M-80 Ball projectile. The untreated panel was shot 12 times on a panel measuring 24×24×4.5 mm and yielded a V-50 of 3006 feet per second (fps). However, all shots above 2800 feet per second showed cracking at the point of impact and several of the impact areas showed evidence of shear plugging several times the diameter of the bullet. Moreover, in one test, a panel cracked into three separate pieces. The processed panel was subjected to the same test and showed no signs of cracking or shear plugging, indicating that it has value in armor applications because it can withstand multiple projectile impacts. Shot spacing was 2.00 inches and showed desirable tensile failure with ductile failure modes such as petalling. The V-50 of the processed UHH steel panel was 3110 fps, showing the panel has an increase in ballistic V-50 performance versus the untreated panel, and further has significant improvement in multi-impact performance because it demonstrates substantially minimized cracking.

The processed UHH steel armor disclosed herein may have a UHH steel layer. The UHH steel layer may be attached to a structure to be armored. The UHH steel layer may be of any size, thickness, and shape that may be effectively produced, manipulated, and attached to a vehicle, airplane, wall, or other structure that may be armored. In one embodiment, the UHH steel layer may be a panel approximately 24 inches in width and 24 inches in height. Preferably, the UHH steel layer may be a panel larger than approximately 30 square inches. Further, the UHH steel may be cut, molded and welded as needed to accommodate the shapes of an almost infinite number of different vehicles. In one embodiment, the UHH steel may be pre-formed to fit about a certain vehicle.

The processed UHH steel may be attached to the structure to be armored in any manner. In one embodiment, the processed UHH steel may be bolted to the structure. In another embodiment, the processed UHH steel may be adhered to the structure. In still another embodiment, magnets may be used to attach the UHH steel to the structure. While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Moreover, UHH steel treated as discussed above may be utilized as a composite armor based on treated ultra high hardness steel (hereinafter referred to as UHH steel). The composite armor may comprise a UHH steel plate layer, a crack-mitigating and encapsulation layer on both sides of the UHH steel layer, and a plurality of additional supporting or reinforcing ballistic resistant layers. The composite armor contemplated herein may be deployed on vehicles such as land vehicles, trucks, armored personnel carriers, tanks, airplanes, and the like. Further, scaled-down versions of the present invention may be deployed for personal use as heavy body armor, shields, blast shields, and the like.

The term "ultra high hardness steel" (UHH steel) is defined for the purposes of the entirety of this document to refer to a specific type of steel having hardness approximately in the range of Rockwell Hardness C (HRC) 55-70. Generally, the term UHH steel may refer to both untreated UHH steel, and UHH steel treated by the process described herein.

UHH steel having HRC values of approximately 55-70 has been heretofore dismissed as being useful for armor applications. UHH steel, despite having a desirable hardness, has been thought to be too brittle for armor applications. The brittleness is generally so substantial that a UHH steel plate may work once to defeat a projectile, but will be nearly useless after an initial impact because the plate is so heavily cracked or shattered.

The present invention achieves a superior composite armor by utilizing the hardness of the UHH steel to shatter and destroy incoming projectiles. At the same time, the present invention overcomes the problem of brittleness and cracking. The result is a highly effective, low cost and light weight composite armor solution.

The composite armor disclosed herein may have a UHH steel layer. The UHH steel layer may be of any size, thickness, and shape that may be effectively produced, manipulated, and attached to a vehicle, airplane or other device that may be armored. In one embodiment, the UHH steel layer may be a plate approximately 24 inches in width and 24 inches in height. Preferably, the UHH steel layer may be a plate larger than approximately 30 square inches. Further, the UHH steel may be cut, molded and welded as needed to accommodate the shapes of an almost infinite number of different vehicles. In one embodiment, the UHH steel may be pre-formed to fit about a certain vehicle.

In one embodiment, the UHH steel layer may be approximately 0.1875 inch in thickness. In another embodiment, the UHH steel layer may be approximately 0.500 inch in thickness. In still another embodiment, the UHH steel layer may be approximately 0.250 inch thick. In yet another embodiment, the UHH steel layer may vary between 0.1875 inch and 0.500 inch in thickness, depending on the projectiles it is intended to defeat.

The UHH steel may be any steel based alloy having a HRC hardness of approximately 55 to 70. To achieve hardness in this range, the steel may consist of approximately the following elements by weight percentage: 0.43-0.47% carbon, 0.377-1.000% molybdenum, 0.70-1.00% manganese, 0.48-1.5% chromium, and 3% nickel, the balance being iron, and other trace alloying elements which are not critical to the hardness of the UHH steel.

The UHH steel composite armor may have a crack-mitigating layer disposed on the UHH steel layer. In one embodiment, the crack mitigating layer may be disposed on an outer face of the UHH steel plate. In another embodiment, the crack mitigating layer may be disposed on both an inner and an outer face of the UHH steel plate. In yet another embodiment, the crack mitigating layer may be disposed about all surfaces of the UHH steel plate.

The crack-mitigating layer may be any fibrous material capable of being securely disposed on each face of the UHH steel plate that may mitigate cracking of the UHH steel upon a projectile impact. In one embodiment, the crack mitigating layer is composed of a high modulus fiber. In another embodiment, the crack mitigating layer may be a high modulus fiber that has similar material properties to the UHH steel plate, including similar yield strength, tensile strength, and elongation. In one embodiment, the crack mitigating layer may be carbon-fiber. In another embodiment, the crack mitigating layer may be fiberglass. In yet another embodiment, the crack-mitigating layer may be an aramid, including para-aramids and meta-aramids. Further embodiments of crack-mitigating fibrous materials may include nylon, ceramic fibers, and polyethylene, among others.

A resin may be incorporated, or impregnated, into the fibrous material to reinforce the crack mitigating layer. The resin may be any resin capable of incorporation into the fibrous material and capable of curing into a solid state. Examples of suitable resins include but are not limited to epoxy resin, polyester resin, vinylester resin, and the like. The resin may be cured in any manner known in the art including room temperature curing, heat curing, curing under vacuum, or any combination thereof.

Because of the unique properties of the UHH steel of the present invention, the curing of the resin may be performed at a low temperature. Preferably, the temperature may not exceed approximately 250-300 Fahrenheit.

The crack mitigating layer may be disposed on the UHH steel plate in any manner that allows secure attachment to the plate. Once the crack mitigating layer is disposed on the UHH steel plate, the structure formed is a UHH steel composite armor.

In one embodiment, an adhesive may be used to dispose the crack mitigating layer on the UHH steel plate. In a further embodiment, the resin may be used as the adhesive as well as reinforcement for the crack mitigating layer. In another embodiment, the crack mitigating layer may be tightly drawn across the UHH steel plate and attached on an outside edge of the plate. In yet another embodiment, the crack mitigating layer may be mechanically disposed on the UHH steel plate by mechanical attachment such as screws, bolts, rivets, and the like.

In a further embodiment, a plurality of crack mitigating layers may be disposed on the UHH steel plate.

The present invention may use the UHH steel composite armor as a strike face, which is the surface designed to receive a direct impact from an incoming projectile. In further embodiments, additional projectile defeating layers may be employed to reinforce the armor by catching ballistic fragments and/or absorbing impact forces of an incoming projectile. The additional layers may include additional layers of UHH steel composite armor as well.

In one embodiment, one or a plurality of para-aramid layers such as Kevlar® may be attached to an inner side of the UHH steel composite armor. In this embodiment, the outer surface of the UHH steel composite armor may act as a strike face. In this configuration, the para-aramid layer may capture any fragments of the projectile that may pass through the strike face. The number of layers of para-aramid attached may vary depending on the type of projectile intended to be defeated.

In another embodiment, a foam metal may be attached to an inner side of the UHH steel composite armor. The outer surface of the UHH steel composite armor may serve as a strike face. In this configuration, the foam metal layer may capture any fragments of the projectile that may pass through the strike face. The foam metal may also aid in absorbing an acoustic impulse wave caused by projectile impact. The foam metal may vary in thickness based on the type of projectiles intended to be defeated, along with weight considerations and restrictions.

A plurality of UHH steel composite armor layers may be secured together. In one embodiment, a first layer of UHH steel composite armor may be attached to a second layer of UHH steel composite armor. In another embodiment, a layer of foam metal may be disposed between the two layers, by, for example, being adhesively bonded to an inner surface of the first layer. The density of the foam metal may vary depending on intended usage; however, in one embodiment, the foam metal may have a density of 10%. The first layer of UHH steel composite armor may be a strike face. In one embodiment, the first layer of UHH steel composite armor may be slightly thicker than the second.

The above noted embodiment may be further reinforced by adhesively bonding a layer of aramid fiber on an inner surface of the second layer of UHH steel composite armor. The layer of aramid fiber may be adhesively bonded using any suitable adhesive. In one embodiment, a polyurethane adhesive may be employed. In another embodiment, a silyl modified polymer may be employed.

The multiple layers of UHH steel composite armor may be attached together in any manner capable of securely holding them together. Suitable attachment may be performed using, for example: a polyurethane adhesive, an epoxy adhesive, a silyl modified polymer, the plates may be mechanically connected using bolts, screws, or the like or multiple attachment types may be employed, such as the use of an adhesive in combination with a mechanical attachment.

A method of using UHH steel in ballistic armor applications by overcoming its brittleness is contemplated herein. As noted above, a substantial drawback to the use of UHH steel in ballistic armor applications is its brittleness. This brittleness leads to cracking and/or shattering of the UHH steel upon projectile impact. The shattering severely limits the effectiveness of the armor after a first impact. The method herein comprises the application of a crack-mitigating composition to a first side and a second side of a UHH steel plate to overcome the brittleness of the UHH steel.

The method disclosed herein may comprise the steps of selecting a suitable UHH steel layer, selecting a suitable material for a crack mitigating layer, adding a resin to reinforce the crack mitigating layer, curing the resin of the crack mitigating layer, bonding the crack mitigating layer to a first side and a second side of a UHH steel plate, thereby creating a composite ballistics armor, and mounting the composite ballistics armor to a vehicle.

The step of selecting a suitable UHH steel layer may be performed by identifying, ordering and/or receiving a quantity of steel with qualities of UHH steel. Suitable UHH steel may have an HRC of approximately 55-70. In one embodiment, the UHH steel layer may have an HRC hardness greater than 60. In another embodiment, the UHH steel layer may have an HRC hardness greater than 65.

The step of selecting a suitable material for the crack mitigating layer may be performed by identifying, ordering, and/or receiving a high modulus fibrous material that has similar material properties to the UHH steel. Suitable materials for the crack mitigating layer include but are not limited to carbon-fiber, fiberglass, aramid fibers, including para-aramids and meta-aramids, nylon, ceramic fibers, and polyethylene, among others.

The step of adding a resin to reinforce the crack mitigating layer may be performed in any manner that allows the fibrous material to be impregnated with the reinforcing resin. In one embodiment, the resin may be pre-impregnated with the fibrous material (commonly referred to as "pre-preg"). In another embodiment, the resin may be sprayed onto the fibrous material. In yet another embodiment, the resin may be painted onto the fibrous material. In still another embodiment, the fibrous material may be soaked in the resin and removed for bonding once saturated with resin. In still another embodiment, a resin may be added to the fibrous material by vacuum assisted resin transfer molding (VARTM).

The step of curing the crack mitigating layer ensures that the resin is properly set and ensures that the crack mitigating layer has the appropriate properties needed to mitigate cracking of the UHH steel plate. In one embodiment, the curing may be done in the open air by air curing. In another embodiment, the crack mitigating layer may be vacuum cured by covering the uncured resin-impregnated fibrous material with an air-tight material such as a plastic film, and drawing a vacuum within the covering. In yet another embodiment, a quantity of heat may be applied to the resin impregnated fibrous material. In still another embodiment, a combination of heat and vacuum may be employed to cure the crack mitigating layer.

The step of bonding the crack mitigating layer to a first side and a second side of the UHH steel plate may be performed in any manner that allows the crack mitigating layer to be securely bonded to the UHH steel. In one embodiment, the resin may act as an adhesive as well as reinforcement, both bonding the fibrous material to itself, and also the UHH steel. In this embodiment, the bonding step may be performed nearly simultaneously with the step of adding a resin. In another embodiment, the crack mitigating layer may be bonded to the first and second side of the UHH steel plate by an adhesive such as a polyurethane adhesive, epoxy adhesive, silyl modified polymer adhesive, and the like. In yet another embodiment, the crack mitigating layer may be mechanically bonded to the UHH steel plate. In still another embodiment, the crack mitigating layer may be tightly drawn across the UHH steel plate.

Once the crack mitigating layer has been properly formed and bonded to the UHH steel plate, it may function as a UHH steel composite armor.

The step of mounting the UHH steel composite armor to a vehicle may be performed in any way such that the armor may be securely and operatively attached to the vehicle. In one embodiment, the UHH steel composite armor may be mechanically mounted on the vehicle by, for example, bolting, nailing, riveting or screwing. In yet another embodiment, the UHH steel composite armor may be pre-formed to a shape of a vehicle, and may act as the body of the vehicle by being mounted to a vehicle frame.

Exemplary test results of the present invention demonstrate that it may provide the same ballistic protection as expensive and cumbersome ceramic armor.

In one embodiment, a single UHH steel plate having crack-mitigating layers disposed on each side, measuring 24 inches by 24 inches by 0.200 inch is adhesively bonded to a 24 inch by 24 inch by 0.500 inch thick polyethylene laminate. The adhesive bond is achieved with a silyl modified polymer. The plate is shot with a 7.62×52 M61 armor piercing projectile at a zero degree obliquity in a room temperature environment according to Mil STD 662F. The resultant V-50 is 2690 fps.

In comparison, a ceramic composite laminate measuring 24 inches by 24 inches consisting of a plurality of 98% pure 9 millimeter (0.354 inch) thick alumina oxide ceramic tiles is encapsulated with 3 layers of carbon fiber on both front and back surfaces and then is bonded with silyl modified polymer to an aramid laminate consisting of 18 layers of woven aramid fabric constructed from 3000 denier and 17×17 pic count. The plate is shot with a 7.62×52 M61 armor piercing projectile at a zero degree obliquity in a room temperature environment according to Mil STD 662F. The resultant V-50 is 2714 fps.

In another testing embodiment, a composite ballistics armor is designed and manufactured having an "A Kit" and a "B Kit." The composite ballistics armor is based on the UHH steel contemplated herein. Acting as a strike face is a single UHH steel plate measuring 24 inches by 24 inches by 0.250 inches having 3 layers of carbon fiber pre-impregnated with an epoxy material (hereinafter referred to as "pre-preg") applied to the front surface of the 0.250 inch UHH steel plate and 3 layers of carbon fiber/epoxy pre-preg material applied to the back surface of the UHH steel plate. A single laminate armor panel consisting of 24 layers of 17×17, 3000 denier aramid is adhesively bonded to the non-strike face side of the "A Kit" using a polyurethane adhesive. A second UHH steel/carbon fiber/epoxy composite is designed and manufactured as a "B Kit". This is done with a single piece of UHH steel plate measuring 24 inches by 24 inches by 0.290 inches having 3 layers carbon fiber/epoxy prepreg material applied to the front surface of the 0.290 inch UHH steel and 3 layers of carbon fiber/epoxy pre-preg material applied to the back surface of the plate. A single piece of 10 millimeter (0.394 inch) thick aluminum foam with a density of 10% is then bonded to the non-strike face of the "B Kit" armor panel using a polyurethane adhesive. The "A Kit" and the "B Kit" are then mechanically attached. The "B Kit" being the outer layer as the strike face and the "A Kit" being an inner layer behind the "B Kit". The total areal density of the mechanically attached plates is 26.75 pounds per square foot. The plate is shot with a 20 mm fragment simulating projectile (FSP) at a zero degree obliquity in a room temperature environment according to Mil STD 662F. The resultant V-50 is 4130 fps.

In comparison, a laminate having a ceramic strike face is tested. The strike face layer includes a plurality of Hexoloy Silicon Carbide tiles measuring 4"×4"×.550" and the inner layer includes a commercially available 0.250 inch thick High Hard Steel plate that conforms to Mil-Spec 46100D. The total areal density of the mechanically attached plates is 25.25 pounds per square foot. The plate is shot with a 20 mm FSP (fragment simulating projectile) at a zero degree obliquity in a room temperature environment according to Mil STD 662F. The resultant V-50 is 4130 fps. Thus the UHH based composite armor provides equivalent performance to ceramic armor at nearly the same weight, substantially less cost and without the problems associated with ceramic armor.

Further testing of the UHH steel based composite armor in the above embodiment demonstrates results superior to ceramic-based armor when tested against a .50 caliber AP M2 projectile at a zero degree obliquity in a room temperature environment according to Mil STD 662F. Under those conditions, the above embodiment yields a resultant V-50 of 3020 fps.

In comparison, the ceramic based armor noted above is tested against a 0.50 cal AP M2 projectile at a zero degree obliquity in a room temperature environment according to Mil STD 662F. The resultant V-50 is 2698 fps.

Turning now to FIG. 1, a flow chart of an embodiment of the invention is provided. The flow chart begins with placing a UHH steel panel in a vessel. Next, a temperature of the panel is decreased within the vessel slowly to a temperature of between −30 F and −450 F. After this, the panel is exposed to and maintained at this temperature for a time period of less than 48 hours. Once this time period is expired, the panel is returned to ambient temperatures for a period of less than 72 hours. Next, the temperature of the panel is increased slowly to between 200 F and 500 F, and maintained at the increased temperature for a period of less than 10 hours. Finally, the panel is again returned to ambient temperature.

Figure 2:
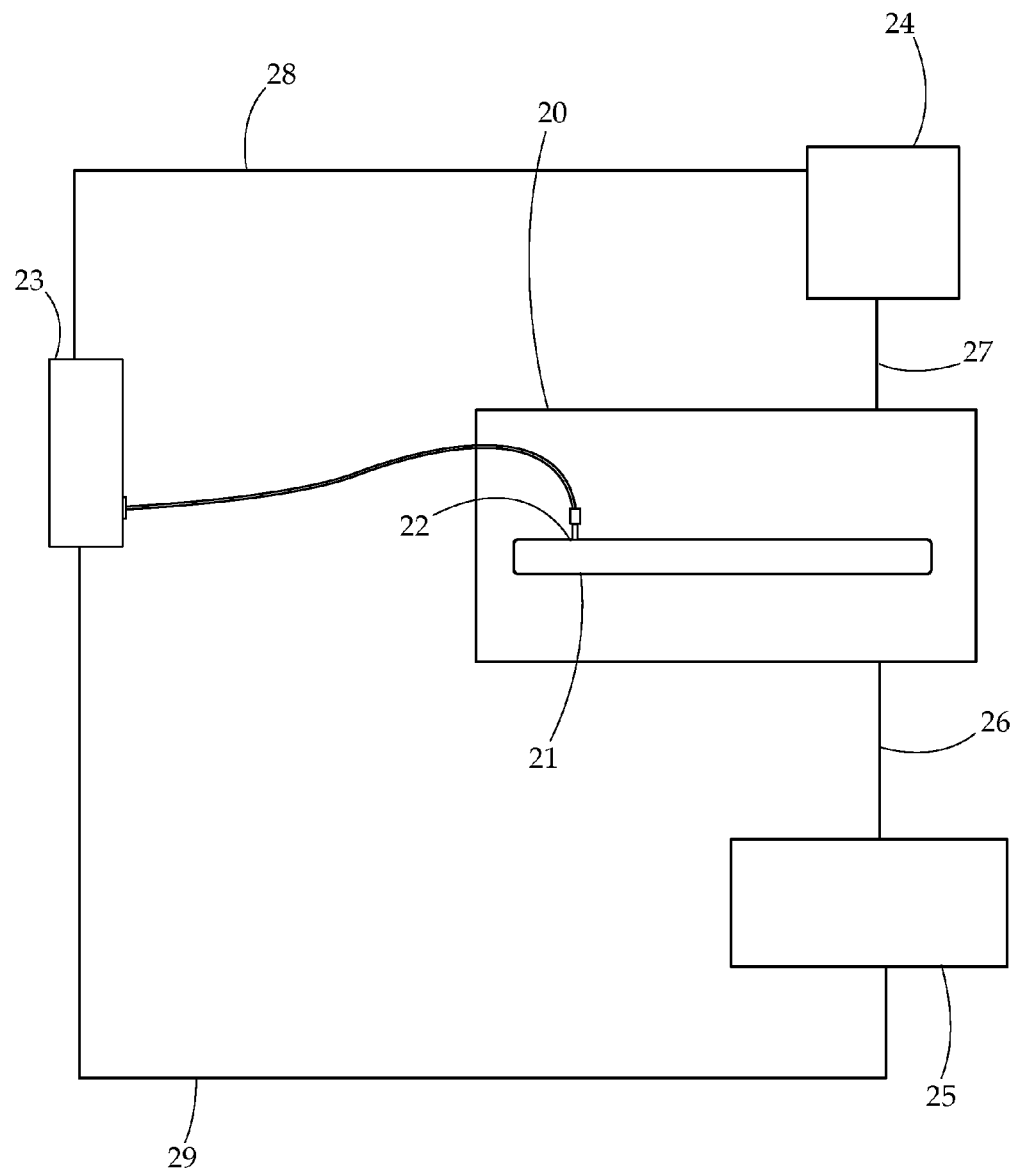
FIG. 2 provides a schematic view of an embodiment of the present invention.

FIG. 2 provides a schematic view of an embodiment of the present invention. A panel of UHH steel 21 is placed within a vessel 20. The vessel may be any structure capable of enclosing the panel 21. Preferably, the vessel may be constructed of materials capable of withstanding both cryogenic as well as high heat temperatures. In one embodiment, the vessel may be insulated. A thermocouple 22 is positioned on or near the panel 21 to measure its temperature. A computer 23 is in electronic communication with the thermocouple 22. The computer 23 is configured to measure, display and in some embodiments record the temperature recorded by the thermocouple 22. Further, in this embodiment, the computer 23 is configured to control the temperature of the panel 21 via one or both of the refrigeration unit 24 and the heating unit 25. The heating unit is connected to an interior of the vessel 20 via connection 26, through which the heating unit 25 may provide heat. Similarly, the refrigeration unit 24 is connected to an interior of the vessel 20 by connection 27, through which the refrigeration unit 24 may provide decreased temperature. The computer 23 is in electronic communication with the refrigeration unit 24 via connection 28. Similarly, the computer is in electronic communication with the heating unit 25 via connection 29. The communication of the computer 23 with the refrigeration unit 24 and heating unit 25 may thus allow the computer 23 to control the temperature of the panel 21 based on input from the thermocouple 22.

Figure 3:
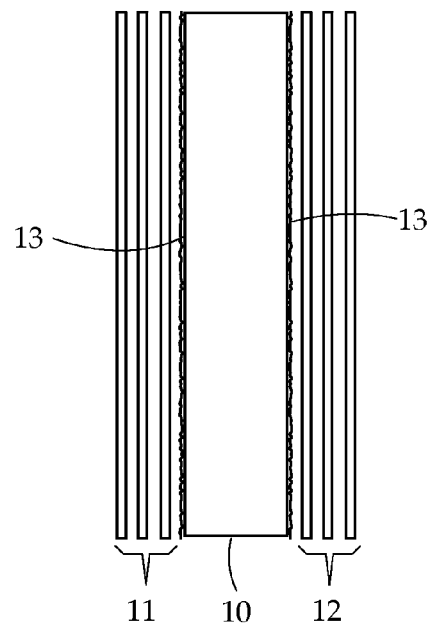
FIG. 3 provides an embodiment of the UHH steel composite armor.

FIG. 3 provides an embodiment of the UHH steel composite armor is shown. A layer of UHH steel 10 has a first crack mitigating layer 11 adhered to an outer face with an adhesive 13. The first crack mitigating layer 11 is shown as three layers, adhered together and to the UHH steel layer 10 using an adhesive 13. The UHH steel layer 10 further has a second crack mitigating layer 12 adhered to an inner face. The second crack mitigating layer 12 is shown as three layers, adhered together and to the UHH steel layer 10 using a resin as an adhesive 13.

Figure 4:
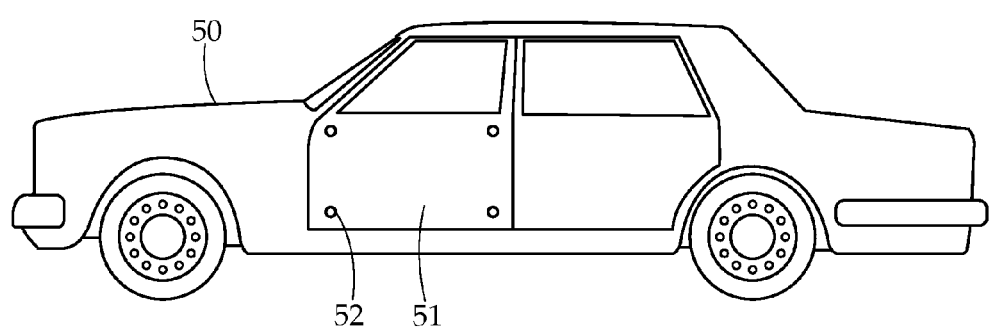
FIG. 4 provides another embodiment of the UHH steel composite armor when mounted to a vehicle.

FIG. 4 shows another embodiment of the UHH steel composite armor when mounted to a vehicle. The UHH steel composite armor 51 is shown removably mounted to a vehicle 50 by a plurality of bolts 52.

Figure 5:
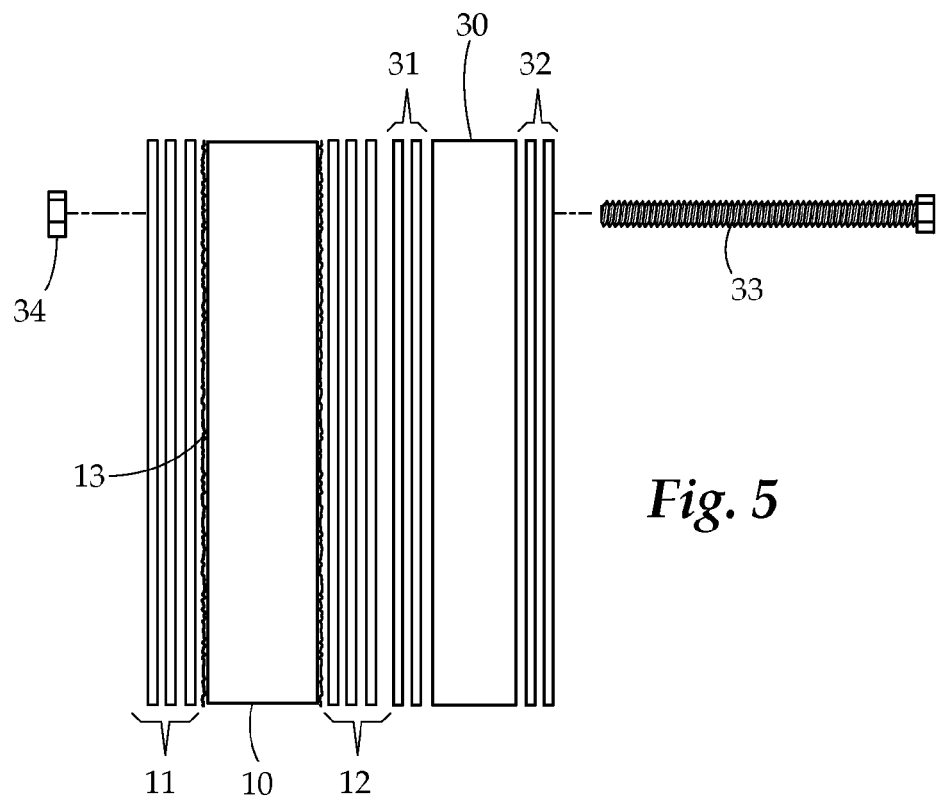
FIG. 5 provides another embodiment of the UHH steel composite armor.

FIG. 5 shows another embodiment of the UHH steel composite armor. A layer of UHH steel 10 has a first crack mitigating layer 11 adhered to an outer face, and a second crack mitigating layer 12 adhered to an inner face by an adhesive 13. A second layer of UHH steel 30 has a first crack mitigating layer 31 adhered to an outer face 31, and a second crack mitigating layer 32 adhered to an inner face. The first layer of UHH steel 10 and the second layer of UHH steel 30 are secured together by a bolt 33 and a nut 34.

Figure 6:
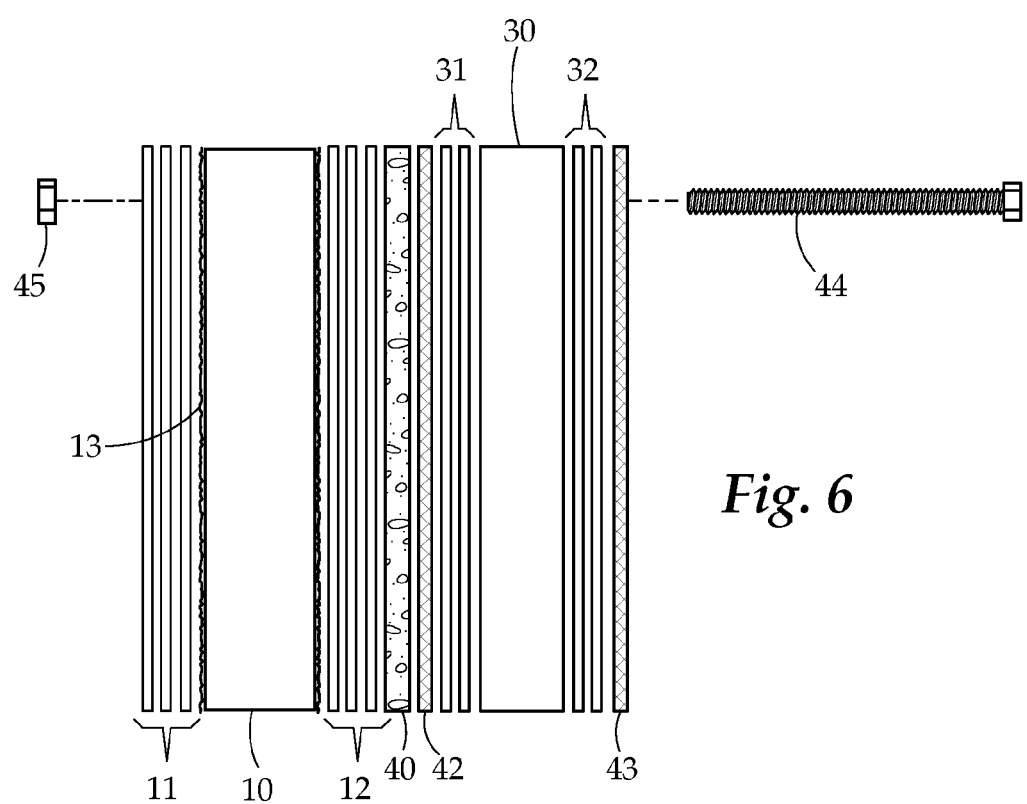
FIG. 6 provides another embodiment of the UHH steel composite armor.

FIG. 6 shows another embodiment of the UHH steel composite armor. A layer of UHH steel 10 has a first crack mitigating layer 11 adhered to an outer face, and a second crack mitigating layer 12 adhered to an inner face using an adhesive 13. A second layer of UHH steel 30 has a first crack mitigating layer 31 adhered to an outer face 31, and a second crack mitigating layer 32 adhered to an inner face. A layer of foam metal 40 is disposed between the first layer of UHH steel 10 and the second layer of UHH steel 30. A reinforcing aramid layer 42 is also disposed between the first layer of UHH steel 10 and the second layer of UHH steel 30. A second reinforcing aramid layer 43 is adhered to the inner face of the second UHH steel plate 30. The layers are held together by a bolt 44 and a nut 45.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A method of processing ultra high hardness steel comprising the steps of:
increasing an elongation property of an ultra high hardness steel panel without decreasing a hardness property of the ultra high hardness steel panel, the ultra high hardness steel having a composition of approximately 0.43-0.47% carbon, 0.377-1.00% molybdenum, 0.70-1.00% manganese, 0.48-1.5% chromium, 3% nickel, and a balance of iron and trace alloying elements, comprising the steps of:
  decreasing a temperature of the ultra high hardness steel panel itself slowly from an ambient temperature to a cryogenic temperature, the cryogenic temperature being between −300 Fahrenheit and −450 Fahrenheit;
  maintaining the ultra high hardness steel panel itself at the cryogenic temperature for a period of less than 48 hours;
  returning the ultra high hardness steel panel itself to ambient temperature slowly;
  maintaining the ultra high hardness steel panel itself at ambient temperature for a period of less than 72 hours;
  heating the ultra high hardness steel panel itself to a temperature of between 200 Fahrenheit and 300 Fahrenheit and holding the ultra high harness steel panel itself at the temperature for a period of less than one hour; and
  returning the ultra high hardness steel panel itself from the temperature between 200 Fahrenheit and 300 Fahrenheit to the ambient temperature.

2. The method of processing ultra high hardness steel of claim 1 wherein the step of decreasing the temperature of the ultra high hardness steel panel slowly from an ambient temperature to a cryogenic temperature is performed by decreasing the temperature of the ultra high hardness steel panel at a rate of between 5 and 10 degrees F. per minute; and further comprising the step of:
utilizing a computerized controller to control the rate of temperature decrease.

3. The method of processing ultra high hardness steel of claim 1 wherein the step of heating the ultra high hardness steel panel to a temperature of between 200 Fahrenheit and 300 Fahrenheit is performed by increasing the temperature of the ultra high hardness steel panel at a rate of between 5 and 10 degrees F. per minute; and further comprising the step of:
utilizing a computerized controller to control the rate of temperature increase.

4. The method of processing ultra high hardness steel of claim 1 further comprising the step of testing the processed ultra high hardness steel, the testing comprising the steps of:
mounting a portion of the processed ultra high hardness steel panel;
firing a ballistic projectile at the portion of the ultra high hardness steel panel; and
recording a result of an impact of the ballistic projectile on the portion of the processed ultra high hardness steel panel.

5. A method of processing ultra high hardness steel comprising the steps of:
placing a quantity of quenched, un-tempered ultra high hardness steel in a vessel, the ultra high hardness steel having a Rockwell Hardness C value of greater than 55, the ultra high hardness steel having a composition of approximately 0.43-0.47% carbon, 0.377-1.00% molybdenum, 0.70-1.00% manganese, 0.48-1.5% chromium, 3% nickel, and a balance of iron and trace alloying elements;

decreasing a temperature of the quantity of ultra high hardness steel slowly from an ambient temperature to a cryogenic temperature, the cryogenic temperature being between −300 Fahrenheit and −450 Fahrenheit;

maintaining the quantity of ultra high hardness steel at the cryogenic temperature for a period of approximately 24 hours;

returning the quantity of ultra high hardness steel to ambient temperature slowly;

maintaining the quantity of ultra high hardness steel at ambient temperature for a period of less than 72 hours;

heating the quantity of ultra high hardness steel to a temperature of between 200 Fahrenheit and 300 Fahrenheit and holding the quantity of ultra high harness steel at the temperature for a period of less than 10; and returning the quantity of ultra high hardness steel from the temperature between 200 Fahrenheit and 300 Fahrenheit to the ambient temperature.

6. The method of processing ultra high hardness steel of claim 5 wherein the step of decreasing the temperature of the quantity of ultra high hardness steel slowly from an ambient temperature to a cryogenic temperature is performed by reducing the temperature of the quantity of ultra high hardness steel at a rate of between 5 and 10 degrees F. per minute.

7. The method of processing ultra high hardness steel of claim 6 further comprising the step of utilizing a computerized controller to reduce the temperature of the quantity of ultra high hardness steel at a rate of between 5 and 10 degrees Fahrenheit per minute.

8. The method of processing ultra high hardness steel of claim 5 wherein the step of returning the quantity of ultra high hardness steel to ambient temperature slowly after the step of maintaining the quantity of ultra high hardness steel at the cryogenic temperature is performed by increasing the temperature of the quantity of ultra high hardness steel at a rate of between 5 and 10 degrees Fahrenheit per minute.

9. The method of processing ultra high hardness steel of claim 8 further comprising the step of utilizing a computerized controller to increase the temperature of the quantity of ultra high hardness steel at a rate of between 5 and 10 degrees Fahrenheit per minute.

10. The method of processing ultra high hardness steel of claim 5 wherein the step of heating the quantity of ultra high hardness steel to a temperature of between 200 Fahrenheit and 300 Fahrenheit for a period of less than 10 hours is performed for one hour.

11. The method of processing ultra high hardness steel of claim 5 wherein the step of heating the quantity of ultra high hardness steel to a temperature of between 200 Fahrenheit and 300 Fahrenheit for a period of less than 10 hours is performed by increasing the temperature of the quantity of ultra high hardness steel at a rate of between 5 and 10 degrees Fahrenheit per minute.

12. The method of processing ultra high hardness steel of claim 11 further comprising the step of utilizing a computerized controller to increase the temperature of the quantity of ultra high hardness steel at a rate of between 5 and 10 degrees Fahrenheit per minute.

13. The method of processing ultra high hardness steel of claim 5 further comprising the steps of:

selecting a suitable material to serve as a crack mitigating layer;

adding a resin to the material selected as the crack mitigating layer to reinforce the crack mitigating layer;

curing the resin;

bonding the crack mitigating layer to the treated quantity of ultra high hardness steel using an adhesive after returning the quantity of ultra high hardness steel to ambient temperature, thereby forming an ultra high hardness steel based composite ballistics armor; and mounting the ultra high hardness steel based composite ballistics armor to a vehicle.

14. The method of processing ultra high hardness steel of claim 5 further comprising the step of keeping the quantity of ultra high hardness steel in the vessel during the steps of decreasing the temperature of the quantity of ultra high hardness steel, returning the quantity of ultra high hardness steel to an ambient temperature, and heating the quantity of ultra high hardness steel.

* * * * *